Oct. 31, 1944.　　J. F. McWHORTER ET AL　　2,361,555
COMPOSITE ARTICLE
Filed March 5, 1942
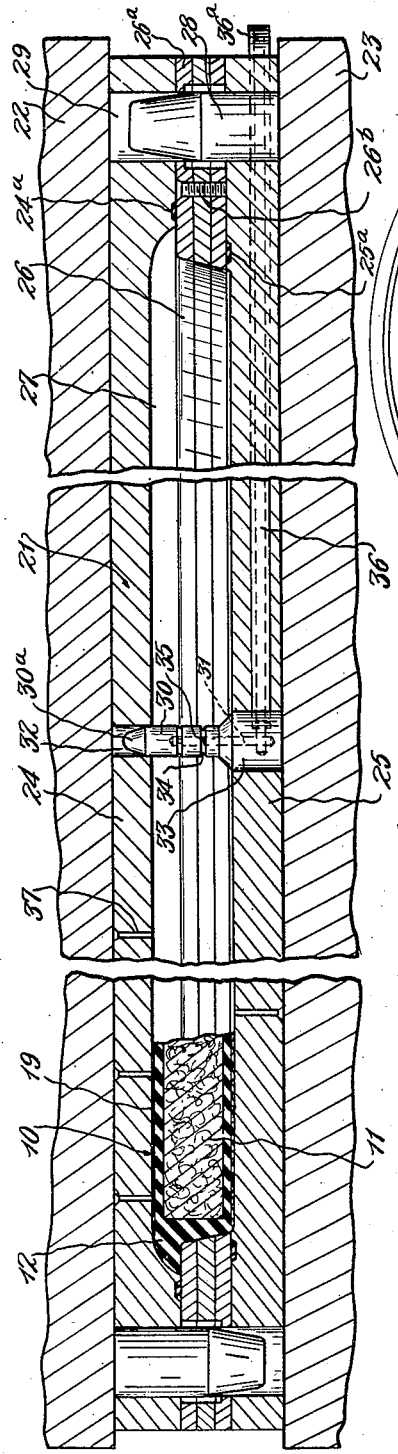
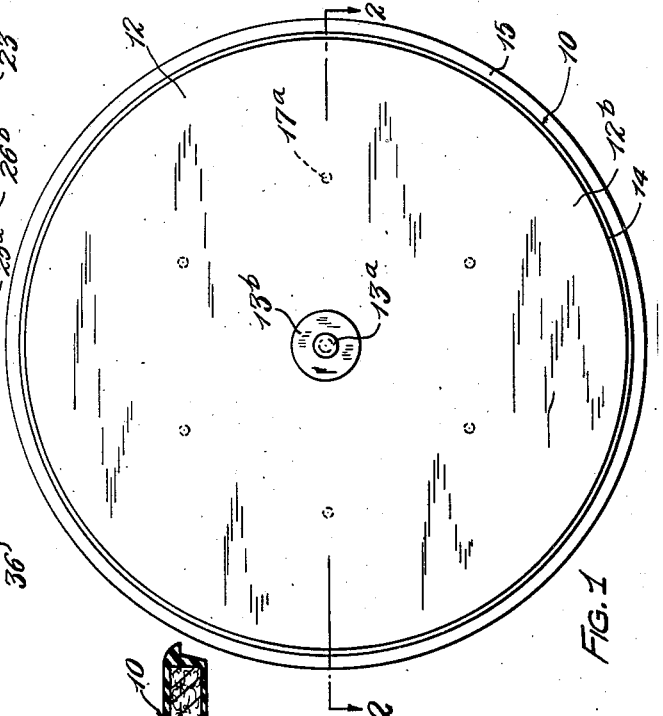
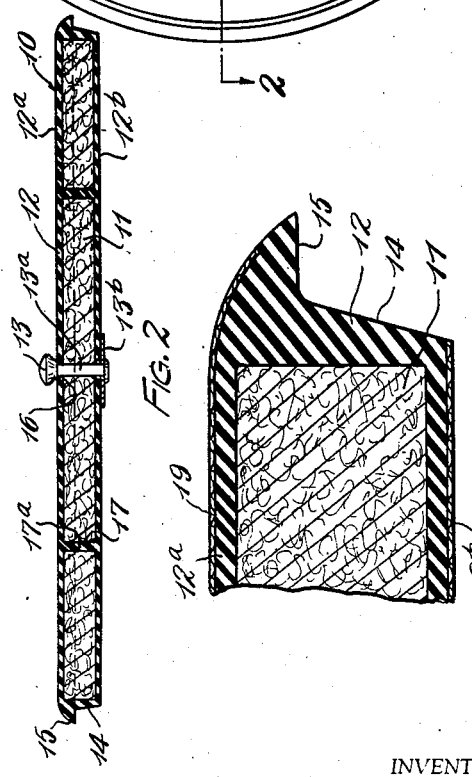
INVENTORS
JOHN F. McWHORTER
BY MARION W. HUMPHREYS
Kwis Hudson & Kent
ATTORNEYS

UNITED STATES PATENT OFFICE 2,361,555

COMPOSITE ARTICLE

John F. McWhorter, Cleveland Heights, and Marion W. Humphreys, Euclid, Ohio, assignors to The Ohio Rubber Company, Willoughby, Ohio, a corporation of Ohio Application March 5, 1942, Serial No. 433,428

2 Claims. (Cl. 220—24)

This invention relates to the manufacture of refrigerator lids or other composite articles of the kind in which insulating material is encased in vulcanized soft rubber, and aims to provide an improved construction for such a composite article.

Our construction involves an improved method of producing it but the same is not claimed herein but in a divisional application Serial No. 478,370, filed March 8, 1943.

To produce a refrigerator lid or other composite article in which a body of insulating material is encased in soft rubber vulcanized in place has presented a problem because the insulating material invariably contains moisture and air and may also contin some gas-evolving ingredients and when the insulating material is subjected to heat during the vulcanizing operation, the moisture is converted into steam and the air or other gas is expanded. This steam or other gaseous medium is trapped in the insulating material by the rubber being molded and vulcanized around it and under the expansive effect of the vulcanizing heat may cause pressure to be generated within the article. It is desirable to open the mold as soon as the rubber has been cured or vulcanized, but if this is done while the internal pressure is still active, such pressure may burst the article or damage the same by causing bulging of the rubber covering.

The object of our invention is to provide an improved construction for a composite article of the kind in which insulating material is encased in vulcanized rubber.

Other objects and advantages of our invention will be apparent from the following description when taken in conjunction with the accompanying sheet of drawings, in which:

Fig. 1 is a bottom plan view of a composite refrigerator lid produced according to our invention;

Fig. 2 is a sectional view taken through the lid on line 2—2 of Fig. 1;

Fig. 3 is a partial transverse sectional view taken through the lid on a larger scale to further illustrate the construction; and Fig. 4 is a transverse sectional view taken through molding apparatus which may be employed in carrying out our invention.

More detailed reference will now be made to the drawing in which we have shown our improved refrigerator lid and the molding apparatus which may be used in producing the improved lid. Our method for producing composite articles will be hereinafter described in detail with reference being made to such refrigerator lid and molding apparatus.

In Figs. 1 and 2 we show our refrigerator lid 10 as comprising insulating material 11 encased in vulcanized soft rubber 12. The lid may be of any desired shape or size and is here shown in the form of a disk provided with a handle 13 and having a tapered rim or periphery 14 with an annular flange 15 projecting beyond such tapered rim. The insulated rubber-covered lid 10 may be used as a lid or cover for what is known as a "deep freeze" unit or with any other desired form of refrigerating apparatus.

The insulating material 11 may be any appropriate kind of insulating material such as a comminuted or fibrous substance which does not readily transmit heat or cold. For this insulating material we prefer to use a disk or slab of fibrous insulating material of the kind known as Celotex. The slab may be of a size, shape, and thickness appropriate to the use to be made of the lid in which the slab is embodied and may have a central opening 16 therethrough, as well as a plurality of spaced openings 17 located inwardly of the outer edge of the slab. The purposes of these openings will be later pointed out.

The rubber covering 12 extends around and substantially completely encases the insulating material or slab 11. As will be explained hereinafter, the rubber covering is molded and vulcanized in place around the insulating material and the top and bottom walls or portions 12a and 12b of the rubber covering, as well as the rim 14 and flange 15, constitute integral portions of a unitary body of rubber. The rubber covering 12 also includes integral stems 17a which extend into or through the openings 17 of the insulating material and connect the top and bottom portions 12a and 12b. These integral stems serve to connect the top and bottom portions 12a and 12b of the rubber covering with the insulating material and with each other so as to strengthen the lid and hold the rubber from blistering or bulging away from the insulating material.

Another feature of our refrigerator lid 10 is the provision of a layer 19 of fabric or duck on its top and bottom faces. This fabric layer extends over substantially the entire top and bottom faces of the lid and is embedded in the surface of the rubber covering 12 so as to become integrally united therewith and so that the rubber will permeate the fabric and provide smooth surfaces on the top and bottom of the lid. This fabric layer reinforces and strengthens the lid and also serves a useful purpose during the molding operation, as will be pointed out hereinafter.

The handle or knob 13 may be connected to the lid by means of a screw or fastening member 13a which extends through a central opening 16 of the insulating slab 11, through aligned openings of the top and bottom walls 12a and 12b, and through a washer 13b. The screw 13a substantially fills or closes the openings of said slab and walls.

In Fig. 4 we show molding apparatus which may be used in producing composite articles by our method, such as the above-described refrigerator lid 10. This apparatus comprises a mold 21 of a form to be received between a pair of cooperating upper and lower platens 22 and 23, which may be a pair of steam-heated platens of a conventional vulcanizing press.

The mold 21 comprises upper and lower sections 24 and 25 and an intermediate ring section 26. The upper and lower sections have recesses or depressions formed in their adjacent faces, and when these sections are in assembled relation with the ring section 26 therebetween, as shown in Fig. 4, they define a working chamber or mold cavity 27. The mold sections may be retained in the desired registering relation by providing the same with suitable dowel pins 28 and dowel pin openings 29. The intermediate mold section 26 may be a single part or member, or preferably, as here shown, may be a laminated structure composed of a plurality of layers 26a held together by means of screws 26b. The upper and lower mold sections may be provided with gaskets 24a and 25a which engage the intermediate section 26 when the mold is in assembled condition, forming a seal around the outer edge of the mold cavity 27.

In using the mold 21 to produce the composite refrigerator lid 10, we place the insulating material or slab 11 in the mold cavity between sheets of uncured rubber stock and with the layers of fabric or duck 19 overlying the sheets of rubber stock, that is to say, extending between the rubber stock and the top and bottom faces of the mold cavity. The thickness of this assembly of insulating material, sheets of rubber stock, and layers of fabric should be substantially equal to, but not materially in excess of, the closed height of the mold cavity 27 so that the mold can be conveniently closed on this assembly without subjecting the same to undue pressure which would compact the insulating material and render the same more dense and less resistant to the transfer of heat or cold. The mold is maintained closed by the pressure of the cooperating platens 22 and 23 of the vulcanizing press, and heat for curing and molding the rubber is supplied to the mold by the platens. During the curing or vulcanizing operation the rubber stock is molded around the insulating material or slab 11 to substantially or completely encase the same in a unitary body of vulcanized rubber, as shown in Figs. 1 and 2. During this operation the fabric layers 19 become embedded in the upper and lower faces of the rubber covering.

When the rubber flows around the insulating material, it will be understood that this material becomes trapped or encased in the rubber. The insulating material invariably contains air and some moisture, and in some instances, may also contain substances which will emit gas when heated. The vulcanizing heat expands the air and converts the moisture into steam, and the resulting gaseous medium creates a pressure within the composite article being formed. The pressure of the gaseous medium acts outwardly against the rubber and serves the useful purpose of pressing the same against the faces of the mold cavity and thus assists in molding the rubber without having the insulating material subjected to undue pressure by the mold sections which, as explained above, might decrease its insulating properties.

If the mold were to be opened while the internal pressure in the article is still active, the article might be blown apart or might be damaged by bulging or blistering of the rubber covering 12. To prevent this and to be able to more or less control the pressure within the article being formed, we provide the mold cavity with a hollow pin or needle 30 which extends into the insulating material and has a passage 31 leading to an external point of the mold so that the gaseous medium trapped in the article can be vented to atmosphere or withdrawn by suction.

The pin 30 may be mounted on the lower mold section 25 so as to extend across the mold cavity 27 and may have a pilot portion 30a which is snugly received and guided in an opening 32 of the upper mold section. The pin 30 may be connected with the lower mold section in any appropriate way as by providing the pin with an enlarged base 33 which is recessed into this mold section. We prefer to locate the pin 30 at a central point of the mold so that the opening 16 which is provided in the insulating body to receive this pin will be appropriately located so that it can be used for the handle-retaining screw 13a. The passage 31 of the pin 30 may communicate with the mold cavity 27 at a plurality of points, and this may be accomplished by providing the pin with axially spaced peripheral grooves 34 which are connected with the passage 31 by radial openings 35. The lower mold section 25 may have a relatively small passage or tube 36 therein which forms an extension of the passage 31 of the pin and has a terminal portion 36a which may open to atmosphere or may be connected with suitable suction apparatus.

We have found the above-described molding apparatus to operate satisfactorily and to produce refrigerator lids of a desired uniform high quality when the tube or passage 36 is left open to atmosphere during the first portion of the molding and vulcanizing operation and is connected to the suction apparatus either during the latter portion of the molding and vulcanizing operation and is connected to the suction apparatus either during the latter portion of the molding and vulcanizing operation or just prior to the opening of the mold 21. By leaving the passage 36 open to atmosphere during the first portion of the molding and vulcanizing operation we find that the gaseous medium trapped in the insulating material 11 creates some pressure within the article being formed and, as explained above, this is desirable for pressing the rubber against the faces of the mold cavity to give the article an accurate shape and smooth finish. Near the end of the molding and vulcanizing operation or just prior to the opening of the mold, we find it desirable to connect the passage 36 to the suction apparatus so as to withdraw the gaseous medium from within the article and thus reduce the internal pressure to a point which will permit the mold to be opened without damage to the product.

Since the mold cavity is sealed around its edge, there will be some air trapped in the cavity at the start of the molding and vulcanizing operation. It is desirable to permit or assist the escape of this air from the mold cavity so that it will not form bubbles or pockets between the rubber and mold faces and result in irregularities in the molded surface of the article being produced. For this purpose we provide a plurality of spaced vent openings 37 which extend through the uper and lower mold members and connect the cavity with atmosphere. We have stated above that the fabric layers 19 serve a useful purpose during the molding and vulcanizing operation. This useful purpose is to conduct the trapped air along the surface of the rubber to the vent openings 37, from which it can escape freely to atmosphere. In accomplishing this purpose the fabric or duck acts more or less in the nature of a wick or porous medium through or along which the trapped air can travel to the vent openings 37.

From the foregoing description and the accompanying drawing, it will now be understood that we have not only provided a novel construction for a composite refrigerator lid or like article, but have also provided a method and apparatus for producing such articles.

While we have illustrated and described our improved article, method, and apparatus in a more or less detailed manner, it will be understood, of course, that we do not wish to be limited to the precise structural features herein disclosed, but regard our invention as including such changes and modifications as do not constitute a departure from the spirit of the invention and the scope of the appended claims.

Having thus described our invention, we claim:

1. A refrigerator lid comprising a hollow body of molded rubber having spaced top and bottom walls, a filler of insulating material in the form of a substantially flat slab substantially filling the cavity in said hollow body and having openings therethrough at spaced points inside its outer edge, rubber stems connecting said top and bottom walls and extending through said openings of said filler, and a layer of fabric extending over the outer faces of said top and bottom walls, said fabric being integrally united with and permeated by said rubber.

2. A refrigerator lid comprising a disk-shaped hollow body of molded soft rubber having spaced substantially flat top and bottom walls, a filler comprising a substantially flat slab of insulating material substantially filling the cavity in said hollow body and having an opening therethrough substantially centrally thereof and other openings therethrough at spaced points between its central opening and its outer edge, said top and bottom walls having openings aligned substantially with the central opening of said filler, integral rubber stems connecting said top and bottom walls and extending through said other openings, a layer of fabric extending over the outer faces of said top and bottom walls and being intgerally united with and permeated by said rubber, and a knob attached to the lid by a fastening member extending through and substantially filling said aligned openings.

JOHN F. McWHORTER.
MARION W. HUMPHREYS.